(12) United States Patent
Kumar et al.

(10) Patent No.: US 12,505,185 B2
(45) Date of Patent: *Dec. 23, 2025

(54) SYSTEMS AND METHODS FOR PROVIDING USER VALIDATION

(71) Applicant: Adeia Guides, Inc., San Jose, CA (US)

(72) Inventors: Vijay Kumar, Karnataka (IN); Rajendran Pichaimurthy, Karnataka (IN); Madhusudhan Srinivasan, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,905

(22) Filed: Dec. 11, 2023

(65) Prior Publication Data

US 2024/0184865 A1    Jun. 6, 2024

Related U.S. Application Data

(63) Continuation of application No. 18/077,616, filed on Dec. 8, 2022, now Pat. No. 11,886,556, which is a continuation of application No. 16/738,930, filed on Jan. 9, 2020, now Pat. No. 11,550,884.

(51) Int. Cl.
  *G06F 21/31*   (2013.01)
  *G06Q 30/0251*   (2023.01)

(52) U.S. Cl.
  CPC ......... *G06F 21/31* (2013.01); *G06Q 30/0251* (2013.01); *G06F 2221/2133* (2013.01)

(58) Field of Classification Search
  CPC ............ G06F 21/31; G06F 2221/2133; G06Q 30/0251

USPC ............................................................ 726/7
See application file for complete search history.

(56) References Cited

U.S. PATENT DOCUMENTS

| | | | |
|---|---|---|---|
| 8,510,795 B1 | 8/2013 | Gargi | |
| 8,925,057 B1* | 12/2014 | Ansari | G06F 21/36 382/209 |
| 11,550,884 B2 | 1/2023 | Kumar et al. | |
| 11,886,556 B2 | 1/2024 | Kumar et al. | |
| 2008/0052245 A1 | 2/2008 | Love | |
| 2009/0012855 A1 | 1/2009 | Jamal et al. | |
| 2009/0210937 A1 | 8/2009 | Kraft et al. | |
| 2009/0235327 A1 | 9/2009 | Jakobsson et al. | |
| 2011/0150267 A1* | 6/2011 | Snelling | G06F 21/36 726/2 |

(Continued)

*Primary Examiner* — Jacob Lipman
(74) *Attorney, Agent, or Firm* — HALEY GUILIANO LLP

(57) ABSTRACT

The system generates a validation tool in response to receiving an indication to initiate validation. The system identifies at least one media content item based on a user profile, and generates at least one question based on the at least one media content item. The at least one media content item may include an image, a video, text, or a combination thereof. The system determines at least one answer corresponding to the at least one question. The question and answer may be determined based on a question template. For example, the template may be selected based on attribute types or values of the at least one media content item. The system generates the at least one question for output on an output device. Upon receiving input indicative to an answer, the system compares the inputted answer to the determined answer to determine whether to validate the user.

20 Claims, 6 Drawing Sheets

(56) References Cited

U.S. PATENT DOCUMENTS

| | | |
|---|---|---|
| 2013/0031641 A1 | 1/2013 | Fisk et al. |
| 2014/0059663 A1 | 2/2014 | Rajshekar et al. |
| 2016/0055329 A1 | 2/2016 | Akula et al. |
| 2019/0156009 A1* | 5/2019 | Maresh .................. G06F 21/36 |
| 2021/0216613 A1 | 7/2021 | Kumar et al. |
| 2023/0222190 A1 | 7/2023 | Kumar et al. |

* cited by examiner

SYSTEMS AND METHODS FOR PROVIDING USER VALIDATION

CROSS-REFERENCE TO RELATED APPLICATIONS

This application is a continuation of U.S. patent application Ser. No. 18/077,616, filed Dec. 8, 2022, which is a continuation of U.S. patent application Ser. No. 16/738,930, filed Jan. 9, 2020, now U.S. Pat. No. 11,550,884, the disclosure of which is hereby incorporated by reference herein in their entireties.

BACKGROUND

The present disclosure relates to systems for generating validation questions, and, more particularly, systems for generating validation captchas including advertisements.

SUMMARY

Credential validation is typically accompanied by captchas for verifying the genuineness of a user trying to access an application. Validation helps prevent automated bots or other software entities from gaining access to the application. For example, the complexity of content (e.g., media content) used for validation purposes may range from simple image analysis to delivering advertisements, which are used to prompt the user to consume the content and answer a question based on the content. Content included in these captchas may be predefined and, in some embodiments, the questions based on content may also be predefined. Predetermination can require frequent replacement of the questions and images so that spying software entities and systems (e.g., using artificial intelligence techniques) do not learn about the validation methods used and answers to questions thereof.

The systems and methods described herein provide utilization of the screen space of the captcha to deliver media content of interest to a user. For example, such media content may include multiple advertisements. Accordingly, questions may be derived dynamically so that a set of advertisements result in a different question each time. The system uses a series of media content items that may be played back randomly with corresponding questions curated based on the sequence, which is determined at runtime randomly, as well as the content. This approach will make it difficult for any probing system to guess or breach, for example. Further, the selection of media content items may attract the user's attention span, resulting in consumption of the media content items.

In an illustrative example, the system generates an authentication tool based on receiving an indication to initiate authentication. The system then identifies media content items based on a user profile. The media content items may include one or more images, videos, sections of text, advertisements, any other suitable media content items, or a combination thereof. For example, the media content item may include a video advertisement with a text overlay. The system generates at least one question based on the media content items, and determines answers corresponding to the at least one question. The system outputs the at least one question so that a user can respond with an answer to complete authentication. For example, if the user provides an answer that corresponds to the determined answer, the system may determine the user is authenticated.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure is directed to systems and methods for providing an authentication tool and performing authentication. In some embodiments, the authentication tool includes a Completely Automated Public Turing test to tell Computers and Humans Apart (CAPTCHA or "captcha" as referred to herein). The system identifies media content such as images, videos, text, advertisements, any other suitable content or combination thereof. The system may include, for example, a web server that generates the captcha by sending a code that has logic to frame questions dynamically based on the media content. The questions have corresponding answers, and the user's input is used to compare to the answers, to test the user's authenticity.

Figure 1:
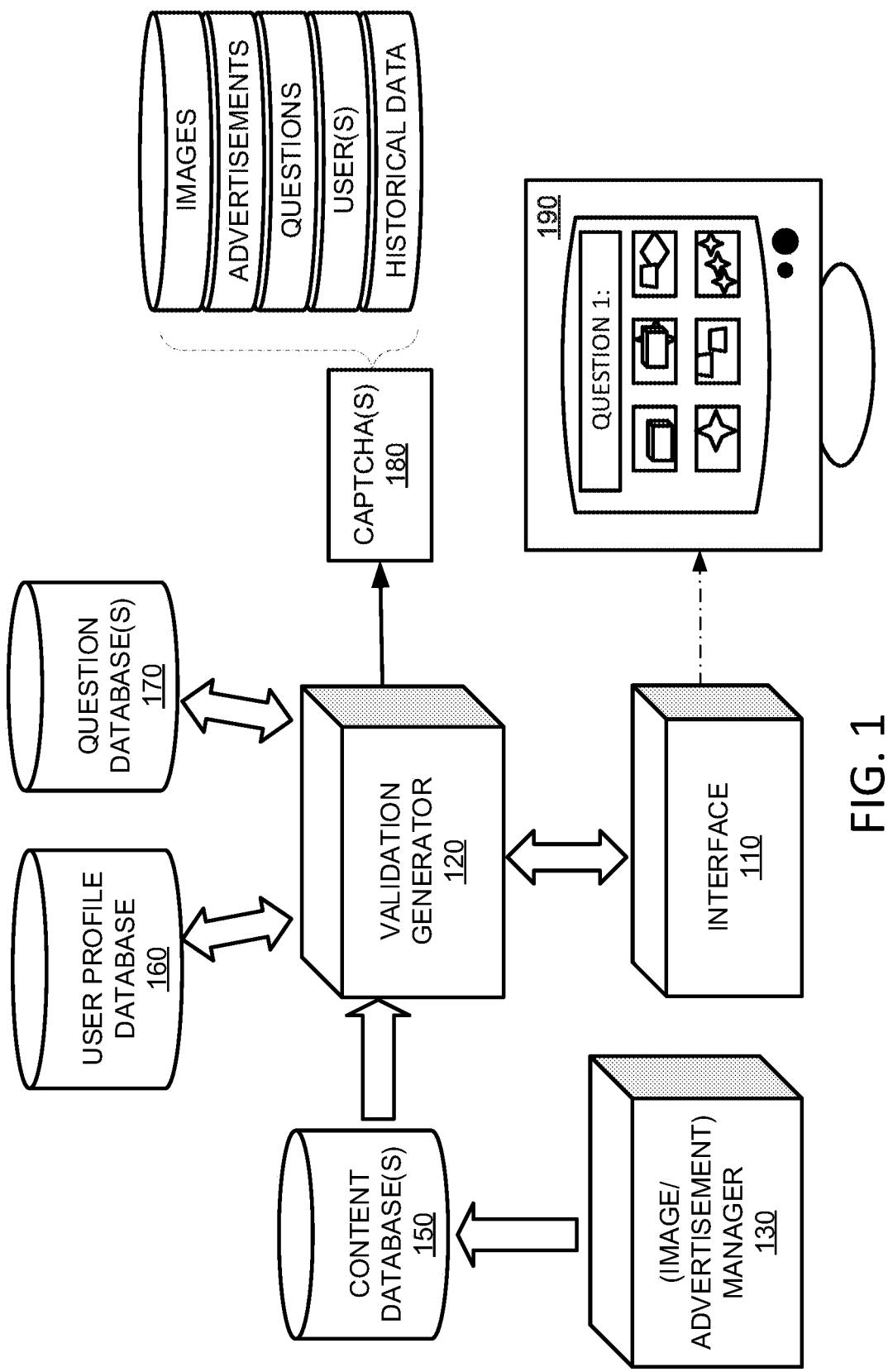
FIG. 1 shows a block diagram of an illustrative system for generating captchas, in accordance with some embodiments of the present disclosure.

FIG. 1 shows a block diagram of illustrative system 100 for generating captchas, in accordance with some embodiments of the present disclosure. Validation generator 120 identifies information associated with images stored in one or more content databases 150. In some embodiments, validation generator 120 retrieves further information from user profile database 160, question database 170, or both to aid in analyzing the image and generating a validation tool.

Validation generator 120 identifies attributes of each image retrieved from content database 150 and, based on these attributes, and other determinations, generates a validation tool that includes one or more questions that must be answered. In some embodiments, for example, validation generator 120, or components thereof, is used to present a validation test to a user, interpret an answer provided by the user, and either validate or invalidate the user based on the provided answer. In some embodiments, validation generator 120 retrieves information from, and/or transmits information to, user profile database 160, question database 170, content database 150, any other suitable source of information, or any combination thereof.

Content database(s) 150 includes content data (e.g., an image or video itself) and metadata corresponding to the content (e.g., a collection of tags or other suitable information). For example, content may include images, videos, text, or combinations thereof. To illustrate, an image may depict a product, object scene/location, person, or a combination thereof, optionally with a text overlay. Metadata associated with the content may include, for example, an identifier (e.g., a file name), a time/date stamp indicating a time of creation, a location tag indicating where the content was created or a location depicted in the content (e.g., generated when the content is created), metadata tags (e.g., keywords, scores, categorizations, and/or any other suitable information), and content details (e.g., quality, resolution, user-defined descriptions, frame rate, and/or any other suitable information). Content database(s) 150 may include images stored in any suitable file format, such as a raster image or a vector image. For example, an image may be stored as a JPEG, TIFF, GIF, BMP, PNG, SVG, or any other suitable file type. In a further example, the image may be stored using any suitable compression technique that may modify the file size of the image data. Content database(s) 150 may include videos, and any accompanying audio, stored in any suitable file format and any suitable video file container type. For example, an image may be stored as an AVI, MOV, WMV, GIF, MP4, MPEG, or any other suitable file type, stored using any suitable compression technique that may modify the file size of the video data. Metadata associated with content may be stored using any suitable file type, having any suitable data structure and organization. For example, the metadata may be stored as a collection of fields or elements, each having one or more entries (e.g., string arrays, numbers, or other data objects). In a further example, the metadata may be stored in the same file as the content data (e.g., the same container), or may be stored in a separate file (e.g., with the content data file including a reference to the metadata file).

In an illustrative example, content database 150 may include an index, a list, a database, or other reference of all content items (e.g., images, videos, text, or any combination thereof) along with attributes corresponding to the content items that may be used by validation generator 120 to generate questions. For example, attributes may include size and shape (e.g., large, medium, small, number of pixels, aspect ratio), color space (e.g., mostly visible, minimally visible, colormap or colors used), objects depicted, arrangements depicted, information depicted, any other suitable attribute, or any combination thereof. Information about attributes may be stored in content database 150 as metadata (e.g., as tags in metadata) associated with the content.

Manager 130 is configured to manage image and advertisement creation, distribution, storage, provision, or any combination thereof. For example, manager 130 may include any suitable content source or combination of sources such as social media applications, media content servers, media content services, media content storage applications, databases, any other suitable content source, or any combination thereof. In some embodiments, manager 130 includes an application executed on a mobile device, a server, a network entity, a personal computer, any other suitable computing device, or any combination thereof. For example, an instance of manager 130 may be hosted by a user's mobile device and may be configured to upload content to content database(s) 150. In a further example, a plurality of instances of manager 130 may be hosted by a plurality of mobile devices, and each instance of manager 130 may upload content generated at the mobile devices to content database(s) 150. In a further example, manager 130 may be implemented as an application hosted by an application server that gathers, tags (e.g., generates metadata for), and stores content from a plurality of network devices communicatively coupled by a communications network.

Validation generator 120, manager 130, or both are configured to store an identifier corresponding to the at least one media content item in content database 150. In some embodiments, validation generator 120, manager 130, or both are configured to store one or more questions in question database 170, wherein the question is linked to the identifier in content database 150. For example, in some embodiments, question database 170 and content database 150 are combined.

User profile database 160 is configured to store user profile information such as, for example, identification information, location information, search queries, search histories, content consumption history, device usage history, product usage history, product purchase history, demographic information, relationship information (e.g., to other entities based on family, work, school, social media network), any other suitable information, or any combination thereof. For example, a user profile may be associated with a device, an application implemented by a device, a user of a device, a person, a corporate entity, a network entity, any other suitable entity, or any combination thereof. In an illustrative example, profile information associated with a plurality of entities may be stored in user profile database 160, and entities may be linked or otherwise indexed based on relationships to other entities, devices, location, interests, behavior, history, any other suitable criteria, or any combination thereof.

Question database 170 may include one or more stored questions, queries, question templates, answers, answer templates, historical information regarding questions, historical information regarding answers, any other suitable information, or any combination thereof. In some embodiments, question database 170 includes questions based on sequences and image attributes, which may be indexed or arranged by keyword or tag. For example, question database 170 may include general questions (e.g., not content item-specific) that may apply to most content items stored in content database 150. Questions may be based on content sequence (e.g., first, last, index, order, or any other suitable aspect of sequence), color (e.g., which colors are present, dominant, associated with an object), objects (e.g., which objects are present), any other suitable criteria, or any combination thereof. In an illustrative example, a question may include further qualification such as a color associated with a second content item in a sequence of six content items. The qualification of "second content item" from the sequence of six identified content items may be selected randomly. In some embodiments, question database 170 includes templates corresponding to multiple formats of questions that can be curated based on content. For example, illustrative templates include questions based on the sequence (e.g., which image or video was presented second), size (e.g., which was smallest or largest size), content (e.g., which content item included text, which content item includes a particular object, which content item includes a specific color), any other suitable criteria, or any combination thereof.

In an illustrative example, validation generator 120 may select a sequence of images (e.g., any suitable number, limited to any suitable number, limited to six) and a random number that is used as an index for access to question database 170 from which the question to be shown (e.g., as part of display 190) is curated along with the expected answer. Based on the sequence of images, validation generator 120 identifies one or more questions and corresponding answers.

Interface 110 is configured to provide output to, and receive input from, a user. Interface 110 may include a display screen, a touchscreen, a keyboard, a keypad, a mouse, a touchpad, any other suitable device or component, or any combination thereof. To illustrate, interface 110 may include a display device having a screen configured to generate displays (e.g., display 190) for interaction. In an illustrative example, interface 110 may include or be coupled to control circuitry and a display device, which is configured to generate display 190. Display 190 may include one or more images, videos, collections of text, or a combination thereof, along with one or more questions corresponding to the images. Each content item may be, or otherwise include, an advertisement. Accordingly, because the authentication display (e.g., display 190) is prominent and the commands the user's attention, the image(s) provided a convenient vehicle for presenting advertisements that will be seen.

In an illustrative example, validation generator 120 may generate a captcha, and interface 110 may generate a display wherein the captcha is arranged above text fields for credentials such as "user id" and "password." This arrangement enables interface 110 to better receive user attention as the user must type in their credentials. In some embodiments, by including the validation tool (e.g., a captcha) on the same display as the tool for receiving credentials (e.g., textboxes or other tools), the user's attention is drawn to the content more fully. To illustrate, the credentials may be used to ensure the user is the authorized user, while the validation tool ensures that the user, and not a software entity, is attempting validation.

Validation generator 120 may receive a request for validation from interface 110, a network device, an application, or any other suitable source. In response to the request to generate a validation tool (e.g., a captcha), validation generator 120 selects a set of content items. In some embodiments, validation generator 120 selects the content items based on information retrieved from user profile database 160. For example, validation generator 120 may retrieve information for a particular user (e.g., the user attempting validation) and may receive a recommendation of content items from a recommendations engine, which may be, but need not be, included as part of validation generator 120, content database 150, user profile database 160, or a combination thereof. Validation generator 120 may index, sort, arrange, or sequence the content items in the set of content items. For example, in some embodiments, validation generator 120 uses a random generator to sequence the content items of the set randomly (e.g., assign a random number to each and then sort in ascending or descending order). In a further example, in some embodiments, validation generator 120 sequences the content items in the order retrieved, an order based on alphanumeric information (e.g., alphabetical by filename), chronological order by creation date, ascending order by file size, any other suitable sequence, or any combination thereof. Validation generator 120 transmits information regarding the sequenced content items to question database 170 to generate one or more questions or question templates regarding the sequence. For example, in some embodiments, validation generator 120 may use a random number to pick a type, template, or subject of the question. Based on the identified attribute, validation generator 120, question database 170, or both may apply the attribute to the sequence of content items and derive the image for which a question template should be applied. Validation generator 120, question database 170, or both determine an answer to the question based on the image to which the question template is applied. In an illustrative example, in some embodiments, validation generator 120, question database 170 or both determine the content items, sequence of rendering for the content items, one or more questions, and one or more corresponding answers.

In an illustrative example, validation generator 120 may select six images from content database 150, having attributes illustrated in Table 1:

TABLE 1

Attributes of Six Images

| Content Item Name | Content Item Index | Size Attribute | Color Attribute | Object Attribute | Object Name Attribute |
|---|---|---|---|---|---|
| Img1 | 2 | Small | Red | Toothpaste | Colgate |
| Img2 | 4 | Medium | Green | Coffee | Nescafe |
| Img3 | 3 | Large | Yellow | Hamburger | McDonalds |
| Img4 | 6 | Medium | Yellow | Car | Audi |
| Img5 | 5 | Medium | Green | Hamburger | Wendy's |
| Img6 | 1 | Large | Gray | Toothbrush | Colgate |

Validation generator 120 may select the six images of Table 1 from content database 150 based on, for example, product recommendations from user profile database 160 of products the user has purchased or consumed in the past two months. Validation generator 120 may also retrieve metadata associated with the six images, the metadata including attribute information as illustrated in Table 1 (e.g., size, color, object, and object name). In the illustrative example of Table 1, the images include advertisements of products and are selected based on the user's consumption history. In some embodiments, validation generator 120 determines a sequence of the six images using any suitable technique. In the illustrated example, the determined sequence is Img6-Img1-Img3-Img2-Img5-Img4. Based on this sequence, validation generator 120 may query question database 170 to determine one or more questions about the sequence of images. For example, question database 170 may apply a question template that includes index and color, and accordingly may determine a question based on the color of the third image based on a selection of index "3" and attribute "color." To illustrate, the question may be "What is the dominant color in the 3rd image?" (e.g., answer: Yellow) or "Is Yellow the dominant color in the 3rd image?" (e.g., answer: Yes, yes, or Y) or any other suitable question (and corresponding answer(s)).

In some embodiments, content database 150 and question database 170 may be combined such that content items, metadata associated with content items, questions, question templates, answers, answer templates, any other suitable information, or any suitable combination thereof is stored together. Content database 150 and question database 170 may be separate databases stored on the same device, or separate databases stored on separate devices. For example, a validation server or application server may store content, metadata, and question information that may be retrieved by, or included as part of, validation generator 120.

In an illustrative example, Table 2 shows several question templates that may be stored in question database 170. As illustrated in Table 2, question templates include frameworks for generating questions based on a set of content items. For example, referencing question template 1 and a set of content items, an attribute may be selected and a question may be generated based on an index and the attribute (e.g., Which content item includes Yellow?). In a further example, referencing question template 2 and a set of content items, an attribute may be selected and a question may be generated based on more than one index and the attribute (e.g., Which content items include Yellow?). Question template 2 may be used when multiple content items have similar attribute values (e.g., for a color attribute, several images include the same color). In a further example, referencing question template 3 and a set of content items, one or more attributes may be selected and a question may be generated based on the indices and the one or more attributes (e.g., Which content items that include cars also include Yellow?). In a further example, referencing question template 4 and a set of content items, one or more attributes may be selected and a question may be generated based on the indices and the one or more attributes (e.g., How many content items include Yellow?). In a further example, referencing question template 5 and a set of content items, an index and an attribute may be selected and a question may be generated based on the index and the attribute (e.g., Does the 4th content item include Yellow?). In a further example, referencing question template 6 and a set of content items, one or more attributes may be selected and a question may be generated based on the indices and the one or more attributes (e.g., Which content items include cars and stop lights?). The "*" and "**" in Table 2 are used as wildcards, and may include any suitable attribute, index, or other information that may be included in a question.

TABLE 2

Illustrative Question Templates

| Question Template | Question Type | Answer Type | Required Input | Description |
|---|---|---|---|---|
| 1 | Index | Number | 1 attribute | Which item has *? |
| 2 | Indices | Numbers | 1 attribute | Which items have *? |
| 3 | Conditional | varied | varied | For an item having *, what is **? |
| 4 | Total | Number | ≥1 attribute | How many items have *? |
| 5 | Yes/No | Binary | ≥1 attribute | Does item * include **? |
| 6 | Composite | varied | varied | Which item has * and **? |

Figure 2:
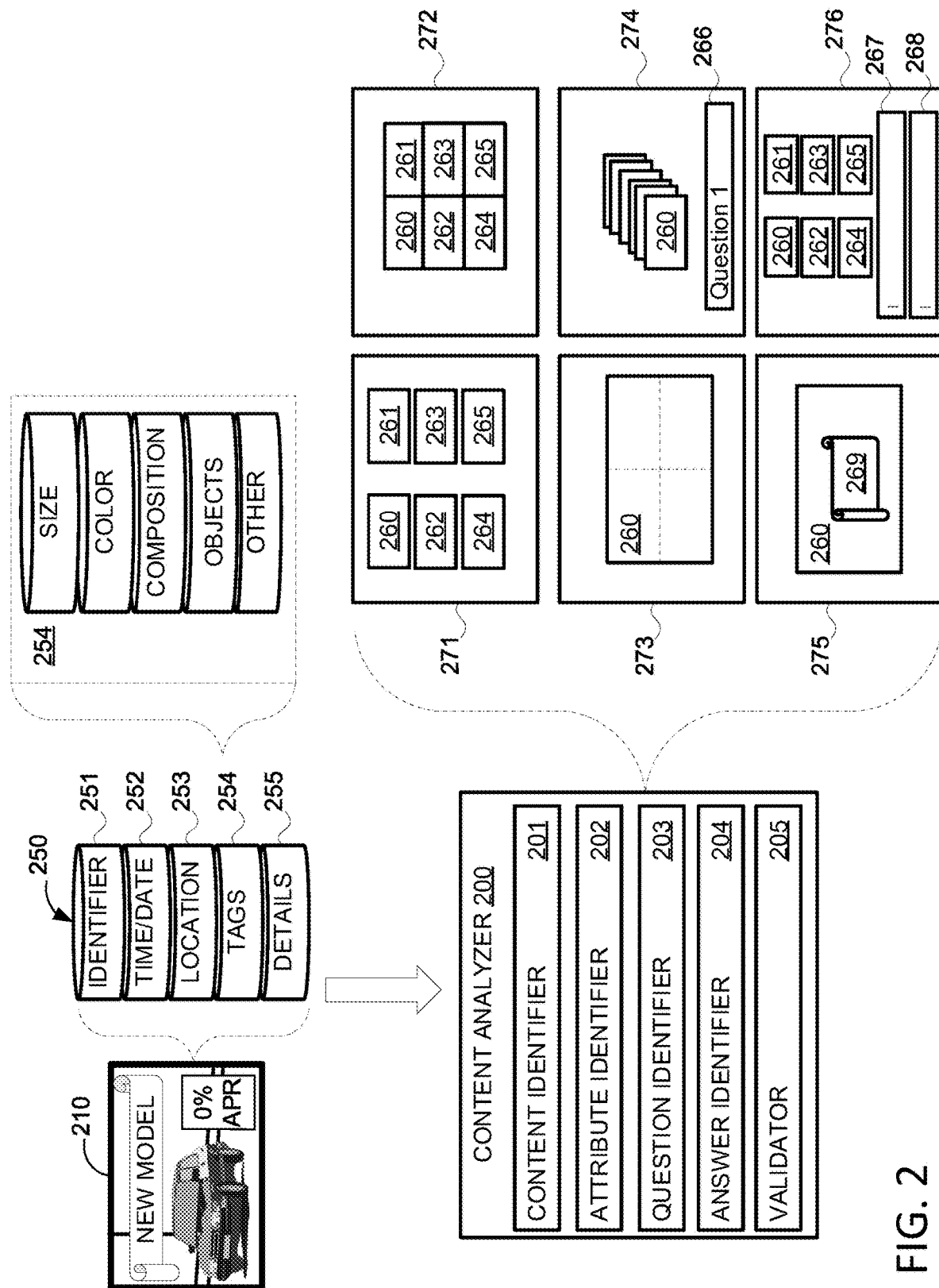
FIG. 2 is a block diagram of an illustrative system for analyzing content and corresponding metadata, in accordance with some embodiments of the present disclosure.

FIG. 2 is a block diagram of an illustrative system for analyzing content (e.g., content item 210) and corresponding metadata 250, in accordance with some embodiments of the present disclosure. As illustrated in FIG. 2, content item 210 may be stored with corresponding metadata 250. Illustrative metadata information 251-255 may be rearranged, added to, reduced, or otherwise modified, or otherwise assume any suitable format, in accordance with the present disclosure. The illustrative partitioning of metadata 250 illustrated in FIG. 2 is merely exemplary and need not be followed. For example, metadata 250 may be organized as a single grouping of information with suitable organization and/or categorization. In some embodiments, a plurality of content items are stored, along with content item 210, in suitable storage of a device, and catalogued or databased in any suitable way.

Identifier 251, as illustrated, includes a device ID (e.g., identifying a device from which the content is generated or stored), a file name (e.g., of the content data, the metadata, or both), and a reference ID (e.g., used as an auxiliary identifier for the image, and may be user-defined). In some embodiments, identifier 251 includes a device hardware address, a device IP address, a device nickname (e.g., as defined by a DNS-type server), any other suitable identification information, or any combination thereof. In some embodiments, identifier 251 includes a file name, a file extension, a file type, a file size, directory information for where the file is stored in memory, any other suitable file-related information, or any combination thereof. In some embodiments, identifier 251 includes a file index, a file nickname (e.g., as specified by a web-based application), a file name of accompanying metadata, a file location of accompanying metadata, any other suitable reference information, or any combination thereof.

Time/date stamp 252, as illustrated, includes a time of generation (e.g., when content item 210 was created), a time when content was saved (e.g., when content item 210 was first or most recently saved), a time content was uploaded (e.g., when the content item was uploaded to a web-based application), a time when content was retrieved (e.g., when content item 210 was retrieved by content analyzer 200 or validation generator 120 of FIG. 1), and a time when content was modified (e.g., when content item 210 was modified, if at all). In some embodiments, time/date stamp 252 includes a temporal history of transactions and events involving content item 210. For example, a time of creation for each instance of content item 210, as saved in memory of one or more devices, may be included in time/date stamp 252.

Location 253, as illustrated, includes a user-defined location (e.g., as input by the user to a touchscreen), GPS data (e.g., coordinates or locations based on GPS data), map data, and an entity identifier (e.g., a site name such as "Citi Field"). In some embodiments, location 253 includes a keyword tag inputted by a user (e.g., "Yosemite National Park"). In some embodiments, location 253 includes a GPS tag including raw data, from each of a plurality of satellites, such as a satellite clock value, ephemeris values, and almanac values. In some embodiments, location 253 includes a GPS tag including time, longitude, latitude, altitude, and number of satellites the data is based on.

Tags 254, as illustrated, include attributes, entities, privacy settings, restriction settings, descriptions, user preferences, preferences, compatibilities, and keywords. Attributes may include, for example, references to people, places, events, items/objects, arrangements thereof, colors, composition, any other suitable aspect depicted in content item 210, or any combination thereof. For example, an attribute may include a particular person (e.g., John Doe), a person descriptor (e.g., adult, woman, boy, baby), a binary indication of whether a person is depicted in content item 210, any other suitable person-related information, or any combination thereof.

Attributes may include visible aspects of content item 210. For example, as illustrated, tags 254 may include attributes such as {color=black, red, yellow}, {objects=car, sidewalk, street, text}, {text="New Model", "0% APR"}, {size=300, 400}, any other suitable attributes, or any combination thereof. Accordingly, content analyzer 200 may identify content item 210 and select one or more attributes upon which questions may be based.

Details 255, as illustrated, include owner input, file history, modifications, posted comments, file properties, and image quality. In some embodiments, details 255 include input from a user or content owner (e.g., descriptions, preferences, or status identifiers), a file transaction history (e.g., receiving, transmitting, storing, recalling, modifying), content modifications (e.g., a mapping of changed pixels in a rasterized image), a history of users' interaction with content item 210 (e.g., comments, views, user tags such as "likes"), properties of the content data file or metadata file (e.g., file size, file location, file compression), a quality metric of content item 210 (e.g., a resolution in units of pixels, a color scale such as color, grayscale, or black-and-white, a quality identifier such as good, bad, or blurry), any other suitable information, or any combination thereof.

Content analyzer 200 (e.g., which may be similar to validation generator 120 of FIG. 1) is configured to identity content items (e.g., such as content item 210), analyze the content items, generate questions and answers, and generate a validation tool. As illustrated, content analyzer 200 includes content identifier 201, attribute identifier 202, question identifier 203, answer identifier 204, and validator 205 (e.g., also referred to collectively as application modules 201-205). Content analyzer 250 may include any or all of the functionality of application modules 201-205, which are merely illustrative and need not be separate modules (e.g., a single module may include all of their functionalities). In some embodiments, content analyzer 200 is capable of retrieving information from an external database (e.g., similar to content database 150 of FIG. 1). By applying any or all of application modules 201-205, content analyzer 200 may determine whether a content item (e.g., content item 210) is suitable for use in validation, what type of attributes are selectable, what questions and corresponding answers are available, and what type of validation tool to generate. In some embodiments, content analyzer 200 receives or determines an advertisement audience, preferred attributes, preferred content information, or a combination thereof.

In some embodiments, content identifier 201 determines whether a content item is public, publicly available, private, shared, undesignated, or otherwise available for use in validation. In some embodiments, content identifier 201 accesses metadata (e.g., metadata 250) to determine whether a content item (e.g., content item 210) is appropriate for use in validation, has been previously used for validation, is applicable to a user to be validated (e.g., based on a user profile), or a combination thereof. In some embodiments, content identifier 251 may generate one or more digital signatures corresponding to a content item, describing features and aspects of the image. Content identifier 201 may then compare the digital signatures against one or more reference signatures to determine if the content item is a candidate to be used for validation.

In some embodiments, attribute identifier 202 determines which attributes are included in metadata associated with the content item or set of content items. In some embodiments, attribute identifier 202 accesses metadata (e.g., tags 254) to determine which attributes are tagged. For example, the tags 254 may include information about size, color, composition, objects, or other attributes associated with the content item or set of content items. In some embodiments, attribute identifier 202 may be configured to identify objects of a content item (e.g., content item 210) using any suitable technique such as pattern recognition techniques, artificial intelligence-based machine learning techniques, any other suitable techniques, or any combination thereof. For example, attribute identifier 202 may identify one or more objects of a content item and generate or modify metadata indicative of the identified one or more objects (e.g., generate metadata tags). In some embodiments, attribute identifier 202 determines which, if any, attributes are common to one or more content items (e.g., of a set of content items identified by content identifier 201). For example, in some embodiments, attribute identifier 202 determines whether the content items share colors or tags thereof, share objects or tags thereof, have similar sizes, have similar compositions, or a combination thereof.

In some embodiments, question identifier 203 generates or retrieves one or more questions based on content items identified by content identifier 201, and attributes identified thereof by attribute identifier 202. In some embodiments, question identifier 203 determines, generates, or retrieves a question template, wherein one or more attributes, one or more indices, or a combination thereof are used to populate the question template. Question identifier 203 can apply any of the illustrative templates of Table 2, or any other suitable template or format to generate one or more questions. For example, attribute identifier 202 may determine that each content item of a set of content items has color and objects tagged in associated metadata. Question identifier 203 may apply a question template that includes a reference to color, objects, or both.

In some embodiments, answer identifier 204 determines or retrieves one or more answers corresponding to each question identified by question identifier 203. In some embodiments, based on the question type (e.g., which question template is used), answer identifier 204 may determine an answer to include an attribute value (e.g., for an attribute of color, a value of "red"), a binary answer (e.g., a yes or no based on whether an attribute value matches a reference value), a numerical value (e.g., an index of a content item satisfying the question, a total number of content items that satisfy the question), a user interaction (e.g., selecting one or more areas or objects of a display, selecting from a multiple choice selection, or typing a word in a text box), any other suitable answer type and value, or any combination thereof. In some embodiments, a question template may include or be linked to a corresponding answer template, which includes the format of the answer based on the question and the attributes of the content items. Content analyzer 200, or question identifier 203 and answer identifier 204 thereof, may generate any suitable set of question-answer combinations corresponding to the set of content items identified by content identifier 201.

In some embodiments, validator 205 generates a validation tool based on the set of content identified by content identifier 201 and the question-answer combination(s) of question identifier 203 and answer identifier 204. The validation tool may include a display of one or more content items (e.g., images or videos) simultaneously or sequentially, a display of one or more questions, a credential entry tool, an answer entry tool, any other suitable tools, any other suitable content, or any suitable combination thereof. In some embodiments, validator 205 is configured to receive an input from a user, and compare the input to the one or more answers identified by answer identifier 204. Based on the comparison, validator 205 determines whether the user is validated (e.g., not a bot or other software entity). In some embodiments, validator 205 also analyzes inputted credentials (e.g., a user identification and password) in addition to the answer to validate and verify the user's identity.

In some embodiments, content analyzer 200 (e.g., validator 205 thereof) generates a validation tool based on application modules 201-205. Illustrative displays 271-276 show several arrangements that may be used for validation. Any of the illustrative features or aspects of any of displays 271-276 may be omitted, combined with other features, added, or otherwise modified in accordance with the present disclosure.

Display 271 includes an arrangement of six images 260-265, displayed simultaneously in a 3×2 array. For example, validator 205 may generate display 271 having a question that requires a user to consider all six images 260-265 (e.g., "Which images include cars?", "How many images contain yellow?").

Display 272 includes an arrangement of six images 260-265, displayed simultaneously in a composite image. For example, validator 205 may generate display 272 having a question that requires a user to consider all six images 260-265 as a composite (e.g., "Does the composite include yellow?" "How many cars are shown in the composite image?").

Display 273 includes a display of a single image 260, partitioned into four sections (e.g., separated by dot-dash lines). For example, validator 205 may generate display 273 having a question that requires a user to consider only aspects of a single image 260 (e.g., "How many sections include cars or portions of cars?" "Which sections include yellow?").

Display 274 includes an arrangement of six images 260-265, displayed sequentially one at a time. For example, validator 205 may generate display 271 having a question that requires a user to consider all six images 260-265 (e.g., "Which mages include cars?", "How many images contain yellow?"), wherein images 260-265 are not displayed at the same time. In some embodiments, validator 205 may generate display 271 and the answer may include stopping the sequence when a condition has been satisfied (e.g., press a soft "stop" button when an image with the color "red" appears). Display 274 includes question 266, presented as a text box. Question 266 may be formatted and displayed in any suitable way. For example, question 266 may be displayed as an overlay, a text box, a background, a header, a footer, any other suitable arrangement, or any combination thereof.

Display 275 includes a display of a single image 260, with accompanying content 269. Accompanying content 269 may include text, an image, a video, or any combination thereof, which may include any suitable information. For example, accompanying content 269 may include an advertisement, a question (e.g., generated by question identifier 203), an additional object that may be considered with objects of image 260, an image, a timer (e.g., indicating a time limit for validation), a text box (e.g., into which an answer may be entered), any other suitable tool or information, or any combination thereof.

Display 276 includes an arrangement of six images 260-265, displayed in a 3×2 array with credential tool 267 and answer input tool 268. Credential tool 267 may include one or more text boxes, pull-down menus, selection boxes, any other suitable tools, or any combination thereof. For example, credential tool 267 may include two text boxes (e.g., for a user identifier and a password), a pull-down menu (e.g., for a location), and a soft button (e.g., to enter the entries for analysis). Answer input tool 268 may include one or more text boxes (e.g., to enter an answer), pull-down menus, selection boxes, any other suitable tools, or any combination thereof. In some embodiments, answer input tool 268 need not be displayed. For example, an answer input tool may be configured to detect an area of the display or an object of the display thereof that is selected.

In an illustrative example, in accordance with the present disclosure, a display may include one or more content items (e.g., images 260-265, one or more videos, text, and other suitable content items), one or more questions (e.g., question 266), one or more accompanying content items (e.g., accompanying content 269), one or more credential tools (e.g., credential tool 267), one or more answer input tools (e.g., answer input tool 268), any other suitable feature or tool, or any combination thereof.

Figure 3:
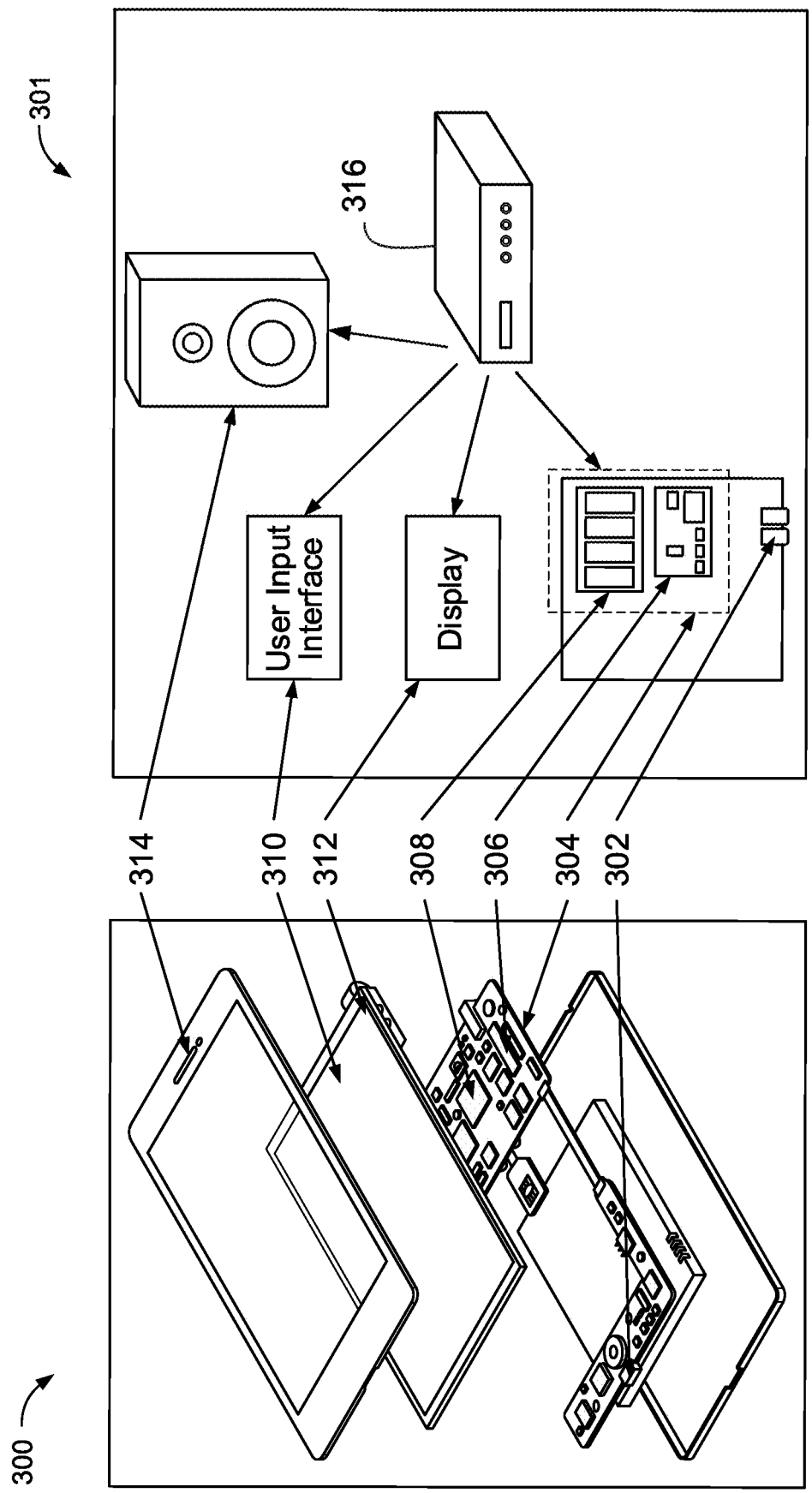
FIG. 3 shows generalized embodiments of an illustrative user device and an illustrative user equipment system, in accordance with some embodiments of the present disclosure.

FIG. 3 shows generalized embodiments of illustrative user device 300 and illustrative user equipment system 301, in accordance with some embodiments of the present disclosure. User equipment system 301 may include set-top box 316 that includes, or is communicatively coupled to, display 312, audio equipment 314, and user input interface 310. In some embodiments, display 312 may include a television display or a computer display. In some embodiments, user input interface 310 is a remote-control device. Set-top box 316 may include one or more circuit boards. In some embodiments, the one or more circuit boards include processing circuitry, control circuitry, and storage (e.g., RAM, ROM, hard disk, removable disk, etc.). In some embodiments, circuit boards include an input/output path. Each one of user device 300 and user equipment system 301 may receive content and data via input/output (hereinafter "I/O") path 302. I/O path 302 may provide content and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing. While set-top box 316 is shown in FIG. 3 for illustration, any suitable computing device having processing circuitry, control circuitry, and storage may be used in accordance with the present disclosure. For example, set-top box 316 may be replaced by, or complemented by, a personal computer (e.g., a notebook, a laptop, a desktop), a network-based server hosting a user-accessible client device, a non-user-owned device, any other suitable device, or any combination thereof.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an application stored in memory (e.g., storage 308). Specifically, control circuitry 304 may be instructed by the application to perform the functions discussed above and below. For example, the application may provide instructions to control circuitry 304 to generate the media guidance displays. In some implementations, any action performed by control circuitry 304 may be based on instructions received from the application.

In some client/server-based embodiments, control circuitry 304 includes communications circuitry suitable for communicating with an application server or other networks or servers. The instructions for carrying out the above-mentioned functionality may be stored on the application server. Communications circuitry may include a cable modem, an integrated-services digital network (ISDN)

modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device such as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, for example, may be used to supplement storage 408 or instead of storage 308.

A user may send instructions to control circuitry 304 using user input interface 310. User input interface 310, display 312, or both may include a touchscreen configured to provide a display and receive haptic input. For example, the touchscreen may be configured to receive haptic input from a finger, a stylus, or both. In some embodiments, user device 300 may include a front-facing screen and a rear-facing screen, multiple front screens, or multiple angled screens. In some embodiments, user input interface 310 includes a remote-control device having one or more microphones, buttons, keypads, any other components configured to receive user input, or combinations thereof. For example, user input interface 310 may include a handheld remote-control device having an alphanumeric keypad and option buttons. In a further example, user input interface 310 may include a handheld remote-control device having a microphone and control circuitry configured to receive and identify voice commands and transmit information to set-top box 316.

Audio equipment 314 may be provided as integrated with other elements of each one of user device 300 and user equipment system 301 or may be stand-alone units. The audio component of videos and other content displayed on display 312 may be played through speakers of audio equipment 314. In some embodiments, the audio may be distributed to a receiver (not shown), which processes and outputs the audio via speakers of audio equipment 314. In some embodiments, for example, control circuitry 304 is configured to provide audio cues to a user, or other audio feedback to a user, using speakers of audio equipment 314. Audio equipment 314 may include a microphone configured to receive audio input such as voice commands and speech (e.g., including voice queries). For example, a user may speak letters or words that are received by the microphone and converted to text by control circuitry 304. In a further example, a user may voice commands that are received by the microphone and recognized by control circuitry 304.

An application (e.g., for managing voice queries) may be implemented using any suitable architecture. For example, a stand-alone application may be wholly implemented on each one of user device 300 and user equipment system 301. In some such embodiments, instructions for the application are stored locally (e.g., in storage 308), and data for use by the application is downloaded on a periodic basis (e.g., from an out-of-band feed, from an Internet resource, or using another suitable approach). Control circuitry 304 may retrieve instructions for the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application is a client/server-based application. Data for use by a thick or thin client implemented on each one of user device 300 and user equipment system 301 is retrieved on demand by issuing requests to a server remote from each one of user device 300 and user equipment system 301. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on user device 300. This way, the processing of the instructions is performed remotely by the server while the resulting displays, which may include text, a keyboard, or other visuals, are provided locally on user device 300. User device 300 may receive inputs from the user via input interface 310 and transmit those inputs to the remote server for processing and generating the corresponding displays. For example, user device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to user device 300 for presentation to the user.

In some embodiments, the application is downloaded and interpreted or otherwise run by an interpreter or virtual machine (e.g., run by control circuitry 304). In some embodiments, the application may be encoded in the ETV Binary Interchange Format (EBIF), received by control circuitry 304 as part of a suitable feed, and interpreted by a user agent running on control circuitry 304. For example, the application may be an EBIF application. In some embodiments, the application may be defined by a series of JAVA-based files that are received and run by a local virtual machine or other suitable middleware executed by control circuitry 304.

Figure 4:
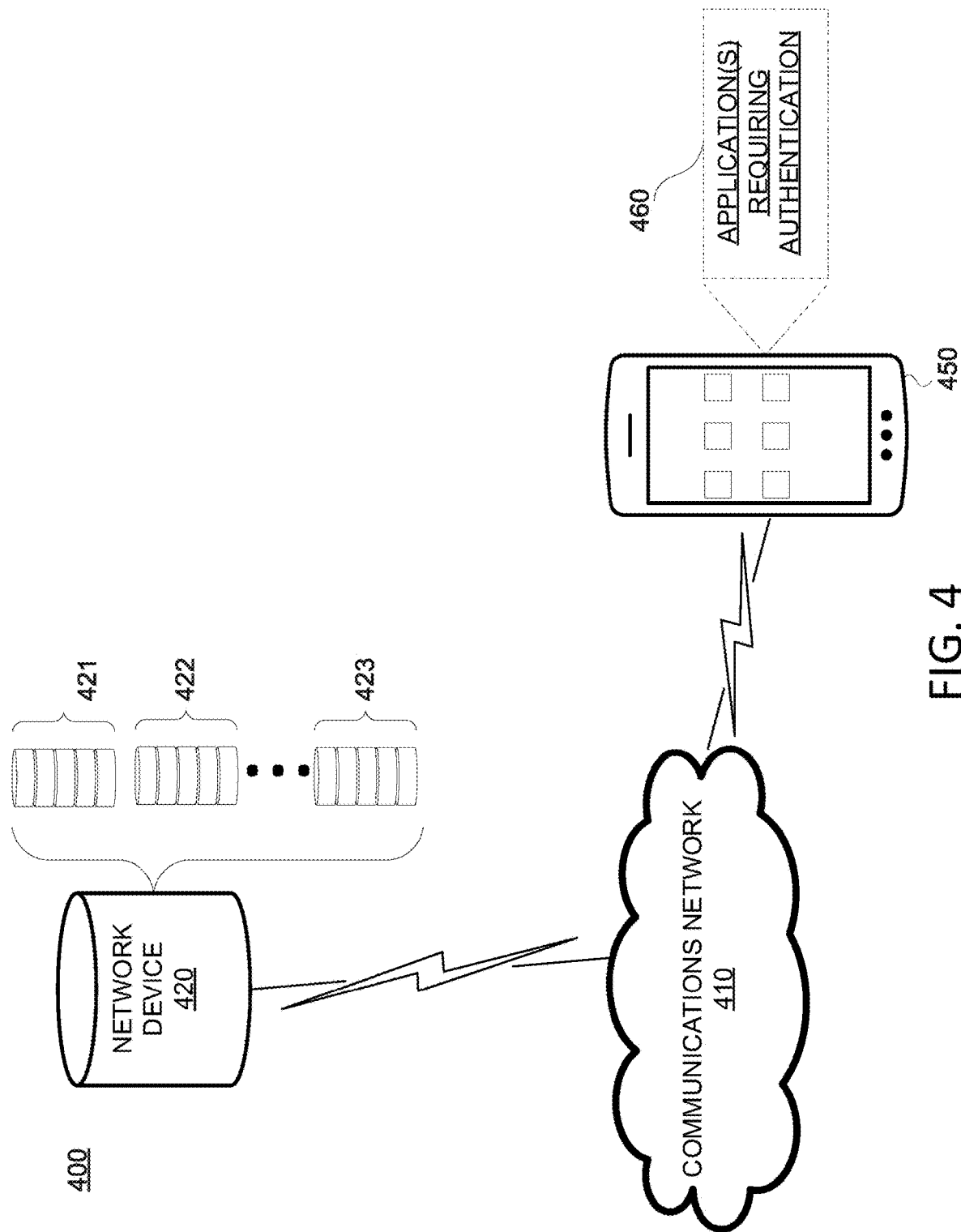
FIG. 4 shows a block diagram of an illustrative network arrangement for generating a validation tool, in accordance with some embodiments of the present disclosure.

FIG. 4 shows a block diagram of illustrative network arrangement 400 for generating a validation tool, in accordance with some embodiments of the present disclosure. Illustrative system 400 may be representative of circumstances in which a user must provide authentication at user device 450, access an application or content requiring authentication at user device 450, or both. In system 400, there may be more than one type of user device, but only one is shown in FIG. 4 to avoid overcomplicating the drawing. In addition, each user may utilize more than one type of user device and also more than one of each type of user device. User device 450 may be the same as user device 300 of FIG. 3, user equipment system 301, any other suitable device, or any combination thereof.

User device 450, illustrated as a wireless-enabled device, may be coupled to communications network 410 (e.g., connected to the Internet). For example, user device 450 is coupled to communications network 410 via a communications path (e.g., which may include an access point). In some embodiments, user device 450 may be a computing device coupled to communications network 410 via a wired connection. For example, user device 450 may also include wired connections to an LAN, or any other suitable communications link to network 410. Communications network 410 may include one or more networks including the Internet, a mobile phone network, mobile voice or data network (e.g., a 4G or LTE network), cable network, public switched telephone network, or other types of communications network or combinations of communications networks. Communications paths may include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although communications paths are not drawn between user device 450 and network device 420, these devices may communicate directly with each other via communications paths, such as those described above, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Devices may also communicate with each other directly through an indirect path via communications network 410.

System 400, as illustrated, includes network device 420 (e.g., a server or other suitable computing device) coupled to communications network 410 via a suitable communications path. Communications between network device 420 and user device 450 may be exchanged over one or more communications paths but are shown as a single path in FIG. 4 to avoid overcomplicating the drawing. Network device 420 may include a database, one or more applications (e.g., as an application server, host server). For example, network device may store information (e.g., content information, metadata, or both) for a plurality of media content items (e.g., data 421, 422, and 423). Multiple network entities may exist and be in communication with network 410, but only one is shown in FIG. 4 to avoid overcomplicating the drawing. In some embodiments, network device 420 may include one source device. In some embodiments, network device 420 implements an application that communicates with instances of applications at many user devices (e.g., user device 450). In a further example, an instance of an application requiring authentication may be implemented on user device 450, with application information being communicated to and from network device 420, which may store profile information for the user, search histories from multiple users, entity information (e.g., content and metadata), any other suitable information, or any combination thereof.

In some embodiments, network device 420 includes one or more types of stored information, including, for example, entity information, metadata, content, historical communications and search records, user preferences, user profile information, advertisement information, any other suitable information, or any combination thereof. Network device 420 may include an applications-hosting database or server, plug-ins, a software developers kit (SDK), an applications programming interface (API), or other software tools configured to provide software (e.g., as downloaded to a user device), run software remotely (e.g., hosting applications accessed by user devices), or otherwise provide applications support to applications of user device 450. In some embodiments, information from network device 420 is provided to user device 450 using a client/server approach. For example, user device 450 may pull information from a server, or a server may push information to user device 450. In some embodiments, when needed (e.g., when data is out-of-date or when a user device receives a request from the user to receive data), an application client residing on user device 450 may initiate sessions with network device 420 to obtain one or more types of information, such as user information (e.g., user profile information, user-created content). For example, the user information may include current and/or historical user activity information such as what content transactions the user engages in, searches the user has performed, content the user has consumed, products the user has used or purchased, whether the user interacts with a social network, any other suitable information, or any combination thereof. In some embodiments, the user information may identify patterns of a given user for a period of time.

In some embodiments, an application may be implemented on user device 450, network device 420, or both. For example, the application may be implemented as software or a set of executable instructions, which may be stored in storage of the user device 450, network device 420, or both and executed by control circuitry of the respective devices. In some embodiments, an application may include a validation application, a verification application, an authentication application, or a combination thereof, that is implemented as a client/server-based application, where only a client application resides on user device 450, and a server application resides on a remote server (e.g., network device 420). For example, an application may be implemented partially as a client application on user device 450 (e.g., by control circuitry of user device 450) and partially on a remote server as a server application running on control circuitry of the remote server (e.g., control circuitry of network device 420). When executed by control circuitry of the remote server, the application may instruct the control circuitry to generate a display and transmit the generated display to user device 450. The server application may instruct the control circuitry of the remote server to transmit data for storage on user device 450. The client application may instruct control circuitry of the receiving user device to generate the application displays.

In some embodiments, the arrangement of system 400 is a cloud-based arrangement. The cloud provides access to services, such as information storage, advertising, shopping, searching, messaging, or social networking services, among other examples, as well as access to any content described above, for user devices. Services can be provided in the cloud through cloud-computing service providers, or through other providers of online services. For example, the cloud-based services can include a storage service, a sharing site, a social networking site, a search engine, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a social media application, an authentication application, an application requiring authentication, a desktop application, a mobile application, any other suitable application, or any combination of applications. User device 450 may be a cloud client that relies on cloud computing for application delivery, or user device 450 may have some functionality without access to cloud resources. For example, some applications running on user device 450 may be cloud applications (e.g., applications delivered as a service over the Internet), while other applications may be stored and run on user device 450. In some embodiments, user device 450 may receive information from multiple cloud resources simultaneously.

Figure 5:
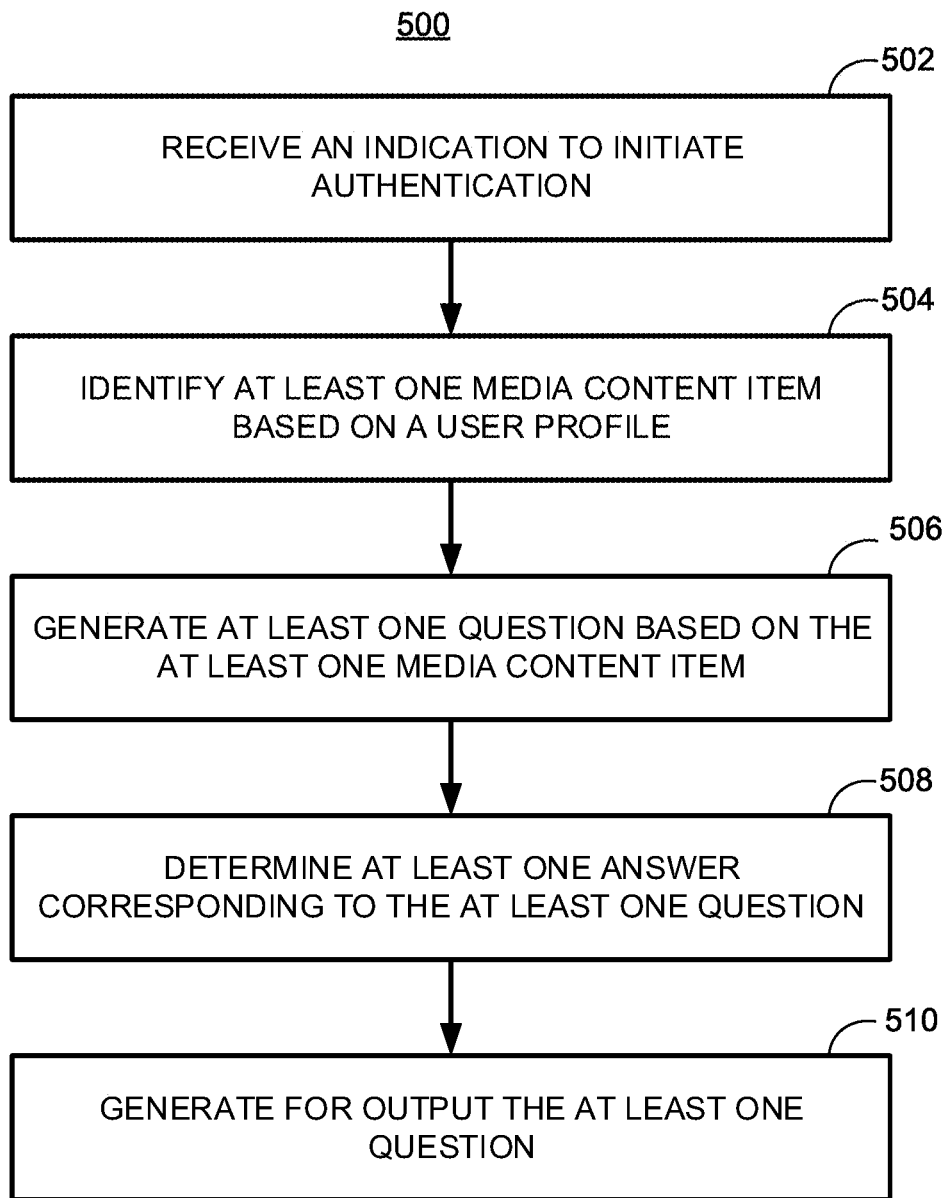
FIG. 5 shows a flowchart of an illustrative process for generating a validation tool, in accordance with some embodiments of the present disclosure.

FIG. 5 shows a flowchart of illustrative process 500 for generating a validation tool, in accordance with some embodiments of the present disclosure. Process 500 may be implemented by any suitable device or combination of devices such as, for example, user device 300 of FIG. 3, illustrative user equipment system 301 of FIG. 3, user device 450 of FIG. 4, network device 420 of FIG. 4, any other suitable device, or any combination thereof. Process 500 may be implemented using any suitable application, hardware, or a combination thereof such as, for example, system 100 (e.g., validation generator 120 thereof) of FIG. 1, content analyzer 200 of FIG. 2, any other suitable system, application, application module, or any combination thereof. Process 500 is described in the context of an application below for illustrative purposes.

At step 502, the application receives an indication to initiate validation. The application may receive the indication based on user input (e.g., a user attempts access to an application or system requiring validation), from a device (e.g., a user device, a network device), from another application, any other suitable source, or any combination thereof.

At step 504, the application identifies at least one media content item based on a user profile. In some embodiments, the application identifies a user associated with the validation request of step 502 and retrieves user profile information about that user. In some embodiments, the application retrieves user profile information from a database (e.g., user profile database 160). The application may identify user preferences, user purchase or shopping history, user consumption history, demographic information, statistical information, any other suitable information, or any combination thereof to identify one or more media content items. A media content item may include a content item of any suitable format such as, for example, an image, a video, audio, text, or a combination thereof. In an illustrative example, the application may identify an advertisement (e.g., an image, video, text, or combination thereof) directed to one or more products that the user has consumed before or is likely to be interested in purchasing. At step 504, the application may identify one or more media content items, determine the suitability of the one or more media content items for use in validation, retrieve the one or more media content items, retrieve metadata associated with the one or more media content items, or a combination thereof. For example, the application may identify media content items having suitable or desired attributes (e.g., visible attributes that may be unambiguously recognized by the user). In an illustrative example, the application may retrieve a user profile and determine that the user has searched for information regarding pickup trucks, and accordingly may select images that include advertisements for pickup trucks (e.g., images having attributes corresponding to vehicles, trucks, pickup trucks, or brands of pickup trucks). In an illustrative example, step 504 may be performed by content identifier 201 of FIG. 2.

At step 506, the application generates at least one question based on the at least one media content item. In some embodiments, the application identifies one or more attributes of the identified media content items of step 504. For example, the application may identify attributes based on analyzing the one or more media content items, analyzing metadata associated with the one or more media content items, or both. In some embodiments, for more than one media content item, the application determines a sequence of the media content items. For example, the application may generate random numbers to assign to media content items and sort the media content items accordingly (e.g., with sorted position corresponding to an index). In some embodiments, the application determines, retrieves, or both one or more question templates or question-answer templates for formatting a question. In some embodiments, the application generates one or more questions based on the one or more attributes identified, the one or more indices identified, one or more question templates, any other suitable criteria, or any combination thereof. In an illustrative example, step 506 may be performed by question identifier 203, optionally in combination with attribute identifier 202, of FIG. 2.

In some embodiments, at step 506, the application generates the at least one question by generating a query based on metadata tags associated with the at least one media content item, and retrieving the at least one question from a database (e.g., question database 170 of FIG. 1) based on the query. For example, the query may include attribute types, attribute values, index values, any other suitable information, or any combination thereof. In a further example, the application may generate the query based on the metadata tags associated with the at least one media content item by identifying one or more attributes having a value stored in the metadata tags associated with the at least one media content item. In some embodiments, at step 506, the application generates a query based on metadata tags associated with a plurality of media content items, and generates a composite media content item based on the plurality of media content items (e.g., similar to display 272 of FIG. 2).

In some embodiments, at step 506, the application generates the at least one question by determining a question format, identifying a template for the question format, and generating the at least one question based on the template and based on the at least one media content item. For example, the application may determine that a question having a binary answer is preferred, and selects a question template for formatting such a question (e.g., question template 5 of Table 2). In some embodiments, the application determines the question format is based on metadata associated with the at least one media content item. For example, the application may identify attribute types or values, and determine a question template based on the attribute type or value.

In some embodiments, at step 506, the application determines at least one question by determining a plurality of questions, each corresponding to a media content item of the plurality of media content items. In some such embodiments, the application determines a sequence of the plurality of media content items, and determines a corresponding sequence of questions of the plurality of questions. For example, the sequence of questions may correspond to the sequence of the plurality of media content items.

In some embodiments, at step 506, the application generates a question by determining at least one indexing value, identifying a media content item of a plurality of media content items based on the at least one indexing value, and identifying the question corresponding to the media content item. For example, for six images, the application may determine an attribute value for the third image, and determine a question pertaining to the third image (e.g., a question answerable based on attributes of the third image).

At step 508, the application determines at least one answer corresponding to the at least one question of step 506. In some embodiments, at step 508, the application determines one or more answers corresponding to each question determined at step 506. The application may determine the answer based on a template attribute values, logic instructions applied to attribute values, any other suitable criteria, or any combination thereof. An answer may include a numerical value (e.g., a number, a set of numbers), an attribute value (e.g., a text entry, a word such as "red" or "yes"), one or more criteria for evaluating a user input (e.g., which selectable option or area of a display corresponds to a correct answer), one of a binary or multiple choice (e.g., "yes" of yes/no, "A" of A, B, C, and D), or a combination thereof. In an illustrative example, step 508 may be performed by answer identifier 204 of FIG. 2.

At step 510, the application generates for output the at least one question of step 506. In some embodiments, the application generates a display that may include, for example, the one or more media content items (or a subset thereof) identified at step 504, the one or more questions identified at step 506, one or more credential tools, one or more answer input tools, any other suitable content, or any combination thereof. In some embodiments, the application presents one question to the user and validates the user based on their answer to the question. For example, the question may have one or more corresponding answers that are correct, and the user must input at least one correct answer in order for the application to validate the user. In some embodiments, the application presents more than one question to the user and validates the user based on their answers to the questions. The application may receive (e.g., at a user interface) an inputted answer corresponding to the at least one question of step 510 and compare the inputted answer to the at least one answer to provide validation. For example, the application may require that at least a predetermined number of answers are correct (e.g., at least three correct answers out of five questions), that a correct answer is achieved within a predetermined number of attempts (e.g., a user must input a correct answer within three attempts), or that all answers are correct (e.g., five correct answers out of five questions). In an illustrative example, the application may generate a display to be displayed on a display device (e.g., interface 110 of FIG. 1, display 312 of FIG. 3). In an illustrative example, step 510 may be performed by validator 205 of FIG. 2. In some embodiments, the application is configured to receive a user input indicative of an answer at a suitable interface or user device.

Figure 6:
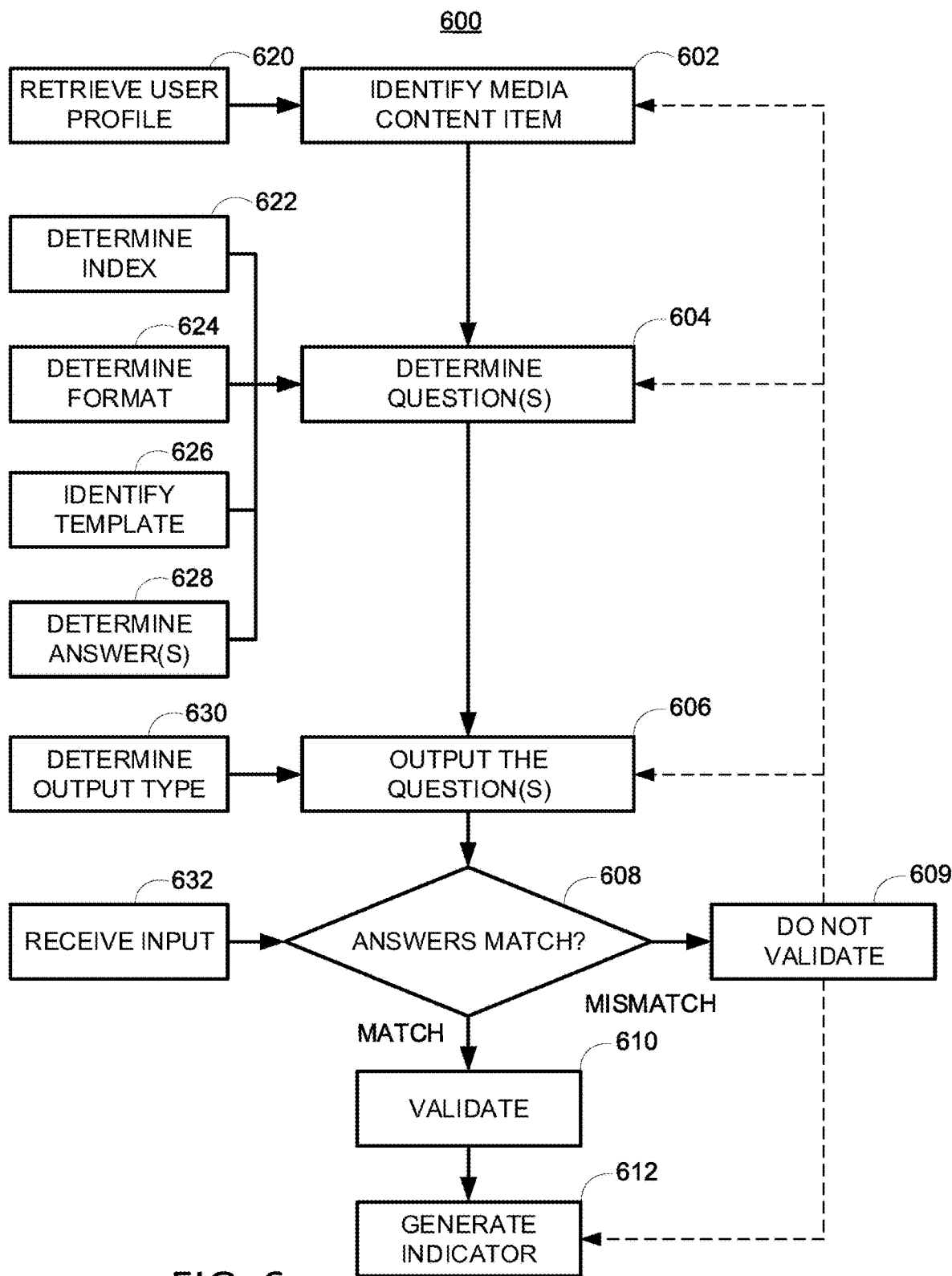
FIG. 6 shows a flowchart of another illustrative process for generating a validation tool, in accordance with some embodiments of the present disclosure.

FIG. 6 shows a flowchart of illustrative process 600 for generating a validation tool, in accordance with some embodiments of the present disclosure. Process 600 may be implemented by any suitable device or combination of devices such as, for example, user device 300 of FIG. 3, illustrative user equipment system 301 of FIG. 3, user device 450 of FIG. 4, network device 420 of FIG. 4, any other suitable device, or any combination thereof. Process 600 may be implemented using any suitable application, hardware, or a combination thereof such as, for example, system 100 (e.g., validation generator 120 thereof) of FIG. 1, content analyzer 200 of FIG. 2, any other suitable system, application, application module, or any combination thereof. Process 600 is described in the context of an application for illustrative purposes.

At step 602, the application identifies at least one media content item based on a user profile. In some embodiments, the application identifies a user associated with the validation request of step 502 and retrieves user profile information about that user. At step 620, the application retrieves user profile information from a database (e.g., user profile database 160 of FIG. 1). The application may identify user preferences, user purchase or shopping history, user consumption history, demographic information, statistical information, any other suitable information, or any combination thereof to identify one or more media content items. A media content item may include a content item of any suitable format such as, for example, an image, a video, audio, text, or a combination thereof. In an illustrative example, the application may identify an advertisement (e.g., an image, video, text, or combination thereof) directed to one or more products that the user has consumed before or is likely to be interested in purchasing. In a further example, a media content item may include a graphics interchange format (gif) or image that supports both animated and static images. At step 602, the application may identify one or more media content items, determine the suitability of a media content item for use in validation, retrieve the one or more media content items, retrieve metadata associated with the one or more media content items, or a combination thereof.

At step 604, the application determines one or more questions based on the one media content identified at step 602. In some embodiments, the application identifies one or more attributes of the identified media content items of step 602. For example, the application may identify attributes based on analyzing the one or more media content items, analyzing metadata associated with the one or more media content items, or both. In some embodiments, for more than one media content item, the application determines a sequence of the media content items. For example, at step 622, the application may determine an index for each media content item. To illustrate, the application may generate random numbers to assign to media content items and sort the media content items accordingly (e.g., index corresponding to sorted position). In some embodiments, at step 624, the application determine a format for formatting a question. For example, the application may determine one or more criteria, rules, constraints, or other guidelines for formatting a question. In some embodiments, at step 626, the application identifies one or more question templates or question-answer templates for formatting a question. In some embodiments, the application generates one or more questions based on the one or more attributes identified, the one or more indices identified, one or more question templates, any other suitable criteria, or any combination thereof. In an illustrative example, step 604 may be performed by question identifier 203, optionally in combination with attribute identifier 202, of FIG. 2. In some embodiments, at step 628, the application determines one or more answers corresponding to each question determined at step 604. The application may determine the answer based on a template, attribute values, logic instructions applied to attribute values, any other suitable criteria, or any combination thereof. An answer may include a numerical value (e.g., a number, a set of numbers), an attribute value (e.g., a text entry, a word such as "red" or "yes"), one or more criteria for evaluating a user input (e.g., which selectable option or area of a display corresponds to a correct answer), one of a binary or multiple choice (e.g., "yes" of yes/no, "A" of A, B, C, and D), or a combination thereof.

At step 606, the application outputs the one or more questions of step 604. In some embodiments, the application generates a display that may include, for example, the one or more media content items (or a subset thereof) identified at step 602, the one or more questions determined at step 604, one or more credential tools, one or more answer input tools, any other suitable content, or any combination thereof. In some embodiments, the application presents one question to the user and validates the user based on their answer to the question. For example, the question may have one or more corresponding answers that are correct, and the user must input at least one correct answer in order for the application to validate the user. In some embodiments, the application presents more than one question to the user and validates the user based on their answers to the questions. In an illustrative example, step 606 may be performed by interface 110 of FIG. 1. In some embodiments, at step 630, the application determines one or more output types. For example, the application may determine the type of captcha or other validation tool to generate, one or more formatting details of the output (e.g., appearance, font, size, color scheme, composition), or both.

In some embodiments, the application is configured to receive a user input indicative of an answer at a suitable interface (e.g., of a user device or other suitable device), in response to the one or more questions outputted at step 606. Step 632 includes the application receiving input to an input interface. The received input may include a numerical value, a selection (e.g., of an option among several options, of an area or object of the display), text (e.g., a word or collection of words), any other suitable input, or any combination thereof.

At step 608, the application determines whether the input received at step 632 matches the determined answer(s) of step 628. If the inputted one or more answers of step 632 match (partially or fully) at least one of the answers determined at step 628, the application may proceed to validate the user at step 610. In some embodiments, the application determines whether the inputted answer is the same as any answer determined at step 628, at least a predetermined number of answers are the same as answers of step 628 (e.g., when multiple questions are outputted at step 606), or any other suitable criteria for evaluating whether an inputted answer matches an expected answer.

At step 610, the application authenticates the user based on the input received at step 632. If the user is validated, at step 610, the application may allow the user access to an application, system, or both. In some embodiments, step 610 requires not only receiving an inputted answer that matches an expected answer, but also receiving a set of credentials (e.g., user identification, password, location, or other suitable criteria) that agree with those of the expected user.

If the inputted one or more answers of step 632 do not match (partially or fully) at least one of the answers determined at step 628, the application does not validate the user, as illustrated by step 609. Step 609 includes the application denying or revoking a validation, authentication, or verification based on mismatched answers identified at step 608. If the user is not validated, at step 609, the application may block access of the user to an application, system, or both.

Further, if the user is not validated, at step 609, the application may return to any step of process 600 other than step 610 (e.g., return to step 602, 604, or 606). In some embodiments, the application identifies a new set of media content items, determines a new set of questions and answers, outputs the new questions (e.g., as part of the same display or a new display), provides an indication to the user that they are not validated (e.g., at step 612), performs any other suitable function, or a combination thereof.

At step 612, the application may generate an indicator of validation or lack of validation. The indicator may include a new display, a modification to an existing display (e.g., an overlay or other text, image, or video indicating validation), initiation of the desired application requiring validation, or access to the system requiring validation. In some embodiments, the indicator may be explicit, including text that indicates validation was successful or unsuccessful. In some embodiments, the indicator need not be explicit, and the provision of access serves as the indication (e.g., the application requiring validation is launched).

It is contemplated that the steps or descriptions of FIGS. 5-6 may be used with any other embodiment of this disclosure. For example, any the illustrative steps of processes 500 and 600 of FIGS. 5-6 may be omitted, appended, combined with other steps, or otherwise modified in accordance with the present disclosure. In addition, the steps and descriptions described in relation to FIGS. 5-6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 1-4 could be used to perform one or more of the steps in FIGS. 5-6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method, comprising:
   receiving a request to verify a user;
   accessing a plurality of video assets for presentation;
   randomly selecting an order to present the plurality of video assets;
   causing the video assets to be played sequentially in the randomly selected order;
   generating for output a first question referencing at least one attribute of a particular video asset of the plurality of video assets, wherein the particular video asset is positioned in a particular position in the randomly selected order, and wherein the first question also references the particular position in which the randomly selected order of the video asset is played; and
   verifying the user based on determining that an answer received based on the first question comprises an identification of the particular position in the randomly selected order.

2. The method of claim 1, wherein generating for output the first question referencing the at least one attribute of the particular video asset of the plurality of video assets further comprises:
receiving a question template from a question database, wherein the question template comprises a placeholder into which an indicator of the at least one attribute is to be inserted.

3. The method of claim 1, wherein the at least one attribute of the particular video asset is one or more of: a color of an object in the particular video asset, a brand referenced in the particular video asset, a phrase occurring in the particular video asset, a song in the particular video asset, a number referenced in the particular video asset, a size of the particular video asset, a shape of the particular video asset, a color space for the particular video asset, a name referenced in the particular video asset, a place referenced in the particular video asset, an event referenced in the particular video asset, the object depicted in the particular video asset, an arrangement depicted in the particular video asset, information depicted in the particular video asset, a keyword referenced in the particular video asset, or a tag of the particular video asset.

4. The method of claim 1, wherein referencing the least one attribute of the particular video asset of the plurality of video assets comprises:
receiving the at least one attribute of the particular video asset from a video asset database; and
retrieving the at least one attribute from metadata of the particular video asset.

5. The method of claim 1, wherein referencing the at least one attribute of the particular video asset of the plurality of video assets comprises:
analyzing the particular video asset to determine the at least one attribute of the particular video asset, wherein the analyzing comprises one or more of: recognizing an object or text in a visual component of the particular video asset, searching closed captions for the particular video asset, or examining an audio component of the particular video asset.

6. The method of claim 1, wherein the verifying the user based on determining that the answer received based on the first question comprises the identification of the particular position in the randomly selected order further comprises:
determining that the user is not a software entity.

7. The method of claim 6, wherein the verifying the user based on determining that the answer received based on the first question comprises the identification of the particular position in the randomly selected order further comprises:
granting the user access to at least one of an application and a system that transmits the request to verify the user.

8. The method of claim 1, further comprising:
generating for output a second question referencing at least one attribute shared by a subset of video assets of the plurality of video assets, wherein the subset of video assets were generated for output in particular positions in the randomly selected order; and
verifying the user based on determining that an answer received based on the second question comprises at least the number of video assets comprised in the subset of video assets, or an identification of each particular position of each video asset in the subset of video assets.

9. The method of claim 8, wherein the verifying the user based on the answer received for the second question further comprises:

accessing a correct response to the second question;
receiving the answer via a user interface;
in response to determining that the answer partially matches the correct response to the second question: verifying the user.

10. The method of claim 8, wherein the verifying the user based on the answer received for the second question further comprises:
receiving the answer via a user interface;
in response to determining that the answer does not partially match a correct response to the second question, blocking access of the user to a system or application transmitting the request to verify the user;
generating a new question referencing a new particular video asset of the plurality of video assets, wherein the new question references a new attribute shared by a new subset of video assets of the plurality of video assets;
presenting the plurality of video assets in the randomly selected order;
generating for output the new question; and
verifying the user based on a new answer received for the new question.

11. A system, comprising:
input/output circuitry configured to:
receive a request to verify a user;
control circuitry configured to:
access a plurality of video assets for presentation;
randomly select an order to present the plurality of video assets;
cause the video assets to be played sequentially in the randomly selected order;
generate for output a first question referencing at least one attribute of a particular video asset of the plurality of video assets, wherein the particular video asset is positioned in a particular position in the randomly selected order, and wherein the first question also references the particular position in which the randomly selected order of the video asset is played; and
verify the user based on determining that an answer received based on the first question comprises an identification of the particular position in the randomly selected order.

12. The system of claim 11, wherein the control circuitry configured to generate for output the first question referencing the at least one attribute of the particular video asset of the plurality of video assets is further configured to:
receive a question template from a question database, wherein the question template comprises a placeholder into which an indicator of the at least one attribute is to be inserted.

13. The system of claim 11, wherein the at least one attribute of the particular video asset is one or more of: a color of an object in the particular video asset, a brand referenced in the particular video asset, a phrase occurring in the particular video asset, a song in the particular video asset, a number referenced in the particular video asset, a size of the particular video asset, a shape of the particular video asset, a color space for the particular video asset, a name referenced in the particular video asset, a place referenced in the particular video asset, an event referenced in the particular video asset, the object depicted in the particular video asset, an arrangement depicted in the particular video asset, information depicted in the particular video asset, a keyword referenced in the particular video asset, or a tag of the particular video asset.

14. The system of claim 11, wherein the control circuitry is configured to reference the least one attribute of the particular video asset of the plurality of video assets by:
- receiving the at least one attribute of the particular video asset from a video asset database; and
- retrieving the at least one attribute from metadata of the particular video asset.

15. The system of claim 11, wherein the control circuitry is configured to reference the least one attribute of the particular video asset of the plurality of video assets by:
- analyzing the particular video asset to determine the at least one attribute of the particular video asset, wherein the analyzing comprises one or more of: recognizing an object or text in a visual component of the particular video asset, searching closed captions for the particular video asset, or examining an audio component of the particular video asset.

16. The system of claim 11, wherein the control circuitry configured to verify the user based on determining that the answer received based on the first question comprises the identification of the particular position in the randomly selected order further comprises:
- determining that the user is not a software entity.

17. The system of claim 16, wherein the verifying the user based on determining that the answer received based on the first question comprises the identification of the particular position in the randomly selected order is further configured to:
- granting the user access to at least one of an application and a system that transmits the request to verify the user.

18. The system of claim 11, wherein the control circuitry is further configured to:
- generate for output a second question referencing at least one attribute shared by a subset of video assets of the plurality of video assets, wherein the subset of video assets were generated for output in particular positions in the randomly selected order; and
- verify the user based on determining that an answer received based on the second question comprises at least one of: the number of video assets comprised in the subset of video assets, or an identification of each particular position of each video asset in the subset of video assets.

19. The system of claim 18, wherein control circuitry configured to verify the user based on the answer received for the second question is further configured to:
- access a correct response to the second question;
- receive the answer via a user interface;
- in response to determining that the answer partially matches the correct response to the second question: verify the user.

20. The system of claim 18, wherein control circuitry configured to verify the user based on the answer received for the second question is further configured to:
- receive the answer via a user interface;
- in response to determining that the answer does not partially match a correct response to the second question, block access of the user to a system or application transmitting the request to verify the user;
- generate a new question referencing a new particular video asset of the plurality of video assets, wherein the new question references a new attribute shared by a new subset of video assets of the plurality of video assets;
- present the plurality of video assets in the randomly selected order;
- generate for output the new question; and
- verify the user based on a new answer received for the new question.

* * * * *